United States Patent
Kuo et al.

(10) Patent No.: US 7,320,547 B2
(45) Date of Patent: Jan. 22, 2008

(54) BALL CHAIN

(75) Inventors: Chang-hsin Kuo, Taichung (TW); Chien-Kuen Lai, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 232 days.

(21) Appl. No.: 11/306,777

(22) Filed: Jan. 11, 2006

(65) Prior Publication Data
US 2007/0160313 A1   Jul. 12, 2007

(51) Int. Cl.
*F16C 29/06*   (2006.01)
(52) U.S. Cl. .......................................... 384/45; 384/51
(58) Field of Classification Search ............ 384/43–45, 384/49, 51, 523
See application file for complete search history.

(56) References Cited
U.S. PATENT DOCUMENTS 6,070,479 A * 6/2000 Shirai .......................... 384/51
6,802,647 B2 * 10/2004 Hausberger et al. .......... 384/45
7,004,633 B2 * 2/2006 Liao et al. .................... 384/45
7,178,982 B2 * 2/2007 Chin-Pei et al. ............. 384/51
2002/0067869 A1 * 6/2002 Michioka et al. ............ 384/45
2002/0090152 A1 * 7/2002 Shirai et al. ................. 384/45
2005/0036721 A1 * 2/2005 Wu et al. ..................... 384/51

* cited by examiner

*Primary Examiner*—Thomas R. Hannon
(74) *Attorney, Agent, or Firm*—Banger Shia

(57) ABSTRACT

A ball chain used in a linear guideway, at either end of the chain is formed a protruded connecting block, the connecting blocks each has an abutting surface that is parallel to a radial direction of a center of the radius of curvature of the ball chain, the abutting surfaces of the connecting blocks of the spacers at both ends of the chain are mated with each other for limiting axial rotation of the ball chain. Due to the two connecting blocks at the end of the ball chain that has entered the return path protrude out of the groove, the end of the chain within the return path will use the abutting surface to limit the end of the chain that has not entered the return path and to guide the end of the chain, which has not entered the return path, into the return path smoothly, thus improving the operating smoothness of the chain.

9 Claims, 8 Drawing Sheets

BALL CHAIN

BACKGROUND OF THE INVENTION

1. Field of the Invention

The present invention relates to a ball chain, and more particularly to a ball chain that is used in a linear guideway, and both ends of the chain are radially mated each other, such arrangement can suppress axial rotation of the ball chain and can improve the operating smoothness of the ball chain.

2. Description of the Prior Art

Referring to FIG. 1, which shows a chain structure 8 that is used in linear guideway to connect a plurality of balls in series. The chain structure 8 includes a plurality of spacers 81 used to separate two neighboring balls 7, and two connecting members 82 are arranged in the axial direction of the chain structure for connecting the plurality of spacers 81 together in series. Each of the spacers 81 is defined with a spherical concave 811 for mating with the balls 7, so that the balls 7 can be retained between two spacers 81.

Referring to FIGS. 2 and 3, a linear guideway 9 comprises a rail 91, a sliding block 92, and two end caps 93 installed at both ends of the slide block 92. In the rail 91 is formed a plurality of ball rolling tracks 911, and the sliding block 92 is defined with a plurality of ball grooves 921 corresponding to the ball rolling tracks 911, and a plurality of circulation passages 922 provided for circulation of the balls 7. In each of the end caps 93 is formed a return path 931 for jointing the circulation passages 922 to the grooves 921, so as to form an endless circulation path for the balls 7.

Since the connecting members 82 protrude out of the balls 7, the sliding block 92 should be defined with receiving grooves for receiving the connecting members 82. In order to facilitate manufacture, the sliding block 92 is usually drilled with a through hole 923 in which an injection-molded plastic pipe 94 is received. Then the circulation passages 922 and the receiving grooves 941 for receiving the connecting members 82 are formed in the pipe 94. Furthermore, the return path 931 is also formed with a groove 932 (as shown in FIG. 4) for receiving the connecting members 82, so that the groove 932 and the receiving grooves 941 can be used to accommodate the connecting members 82, during the movement of the balls 7 and the chain 8.

An ideal chain should be shaped in the form of a circle whose length is the same as the length of the path formed by the ball grooves 921, the circulation passages 922 and the return path 931. However, in real application, it is difficult to make a seamless circular chain, therefore, the chain is usually made in the form a long and narrow chain, and then both ends of the chain are connected together, forming a circle. For example, JP Pat. Nos. 05-52215 and 05-52216 disclose a long narrow chain, at both ends of the chain is arranged a connector for jointing the two ends of the chain together.

However, in order to improve the precision and hardness of the reciprocating motion of the sliding block relative to the rail, it is necessary to change the diameter of the balls so as to produce a pre-pressure, then the purpose of the improving the precision and hardness can be achieved.

When assembling the both-end-connected chain in the sliding block, if first time assembled balls are too large or small to produce an expected pre-pressure, it needs to slice off the already-connected connectors at both ends of chain, then all the balls can be taken out of the chain and the chain should be reloaded with new balls, and then the chain and the new balls should be reassembled in the sliding block for test, until the size of the balls can produce the expected pre-pressure. Such process is very inconvenient.

To overcome the above problems, some people in the art proposed a design in which the outer end of the spacers at both ends of the chain is formed with a concave for mating with the shape of the balls. And in assembly, a buffering ball (disclosed both in JP Pat. Nos. 05-52217 and 06-72612) is additionally disposed between both ends of the chain and received between the concave of the spacers at both ends of the chain.

Besides, some people in the art proposed a chain structure that has no connectors at both ends thereof so as to overcome the assembly problem of the both-end connected chain. For example, JP Pat. No. 10-9264 discloses such a chain structure that has no connectors at both ends thereof, so that an interval will be left between both ends of the chain after the chain is assembled in the sliding block.

However, the chain with an interval left between both ends thereof will form a free end at the both ends, it will cause a problem that the protruding spacers at both ends of the chain will impact the wall of the return path. The continuations of JP Pat. Nos. 10-318257 and 11-2241 have pointed out this problem, and in order to solve it, the both ends are designed to have an axial concave shape and a convex shape, so that the two ends of the chain can be axially engaged with each other, solving the problem of JP Pat. No. 10-9264.

Since the sliding block 92 is made of metal, and the ends caps 93 are made of plastic injection molding, it will have fitting tolerance between the sliding block 92 and the end caps 93. The value of the tolerance is usually determined by whether the balls are able to smoothly pass through the conjunction between the circulation passage 922 and the return path 931. However, the size of the receiving grooves 941 and the concave 932 are much smaller than the circulation passage 922 and the return path 931, the allowable error of the circulation passage 922 and the return path 931 is probably a considerable error as compared to the receiving grooves 941 and the concave 932. In other words, such an error will form comparatively large level difference at the conjunction between the receiving grooves 941 and the concave 932. As shown in FIG. 4, such a level difference will interfere with the passage of the connecting members 82.

The chains disclosed in the aforesaid JP Pat. Nos. 05-52217, 10-9264, 10-318257, 11-2241 and 06-72612 are long and narrow, therefore, both ends of the connecting members 82 are separated no matter the two ends of the chain 8 are connected. And the chain will be pushed, pulled and distorted constantly when it drives the balls to move, therefore, it will have a problem of axial distortion of the chain. Once it occurs, the connecting members 82 in two receiving grooves 941 will be slanted and located at different heights. Both ends of the aforementioned various chain structures are axially connected, and the problem of radial distortion cannot be solved. Therefore, the distortion of the chain will form a force pushing one of the connecting members 82 to impact the conjunction of the receiving groove 941 and the groove 932, as shown in FIG. 4. As a result, the chain and the balls cannot move smoothly. And in order to make the chain move smoothly, this problem must be solved.

In addition, regarding the JP Pat. Nos. 05-52217, 10-9264, 10-318257, 11-2241 and 06-72612, in production of the chain, initially, it should set the balls coated with grease in the mold, and then the chain can be formed by injection molding, therefore, the respective spacers 81 in the formed chain will form a concave 811 corresponding to the shape of the balls 7. In other words, the balls 7 will be in a surface contact relation to the concave 811 of the spacers 81, this will increase the rolling friction of the balls, causing unnecessary momentum waste. This problem also needs to be improved.

The present invention has arisen to mitigate and/or obviate the afore-described disadvantages.

SUMMARY OF THE INVENTION

The primary objective of the present invention is to solve the aforesaid problems by providing a ball chain, wherein both ends of the ball chain are connected by connecting blocks that are parallel to the center of the radius of curvature of return paths, so as to suppress the axial distortion of the chain, and to improve the operating smoothness of the chain.

The secondary objective of the present invention it to provide a ball chain, wherein the connecting blocks at both ends of the ball chain are jointed without being axially fixed, and the length of the ball chain is changeable in response to the work surrounding and the manufacturing errors.

The third objective of the present invention it to provide a ball chain, wherein each of the spacers is a flat and circular structure, so as to reduce the contact surface between the spacers and the balls, thus reducing momentum waste.

To obtain the abovementioned objective, the present invention provides a ball chain, at either end of the chain is formed a protruded connecting block, the connecting blocks each has an abutting surface, and the abutting surfaces are parallel to a radial direction of a center of the radius of curvature of the ball chain (namely the center of the radius of curvature of the return path), the abutting surfaces of the connecting blocks of the spacers at both ends of the chain are mated with each other, thus limiting axial rotation of the ball chain, so that when the ball chain moves in the return path, the abutting surfaces of the two connecting blocks will keep contacting each other. Due to the two connecting blocks at the end of the ball chain that has entered the return path are protrusive and are engaged in the groove, the end of the chain within the return path will use the abutting surface to limit the end of the chain that has not entered the return path and to guide the end of the chain, which has not entered the return path, into the return path smoothly, thus improving the operating smoothness of the chain.

The connection between the two ends of the ball chain can be in various forms. It can be designed such that the each end of the ball chain has a connecting block that is semicircular in cross section, the two blocks are mated with each other, and the abutting surface of the respective connecting blocks is parallel to the direction of the radius of curvature of the return path. Or, it can be designed such that the spacers at both ends of the ball chain each has two radially opposite connecting blocks that are ¼ circle-shaped in cross section, and each of the connecting blocks has an abutting surface that is parallel to the center of the radius of curvature of the return path, so that the connecting blocks at both ends of the chain can mate and connect with each other. Or it can be designed such that the spacers at both ends of the ball chain each has two radially opposite connecting blocks, and each of the connecting blocks has an abutting surface that is parallel to the center of the radius of curvature of the return path, so that the connecting blocks at both ends of the chain can mate and connect with each other.

Furthermore, in order to make the connecting blocks at both ends of the ball chain keep contacting each other when moving in the return path, at least a side of the connecting block or the spacer facing the center of the radius of curvature of the return path needs to be designed to have a guiding angle, so as to form a gap for allowing the two connecting blocks to be staggered.

The two connecting blocks at both ends of the ball chain are jointed without being axially fixed, and the connecting blocks have a certain length, therefore, the total length of the chain has a certain room to change in response to the change of work surrounding (such as the temperature caused expansion and retraction) or the manufacturing error of the sliding block and the end caps, so that the connecting blocks at both ends of the chain can keep contacting with each other.

In addition, the spacers of the present invention are flat structure, so that the balls are in a line contact relation to the spacers, by such arrangement, the contacting surface between the balls and the spacers can be reduced to the least, thus preventing an increase in the waste of momentum.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

The foregoing, and additional objects, features and advantages of the present invention will become apparent from the following detailed description of preferred embodiments thereof, taken in conjunction with the accompanying drawings.

Figure 1:
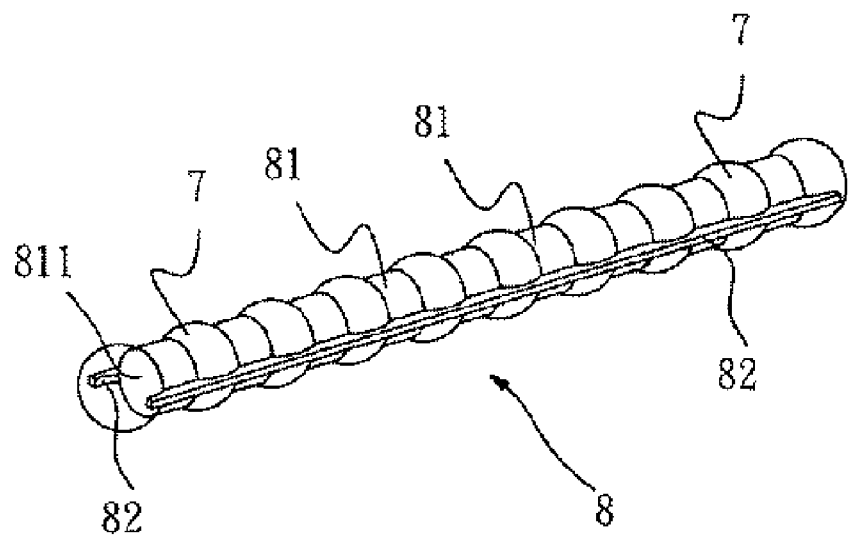
FIG. 1 is an illustrative view of a conventional ball chain structure used in a linear guideway.
Figure 2:
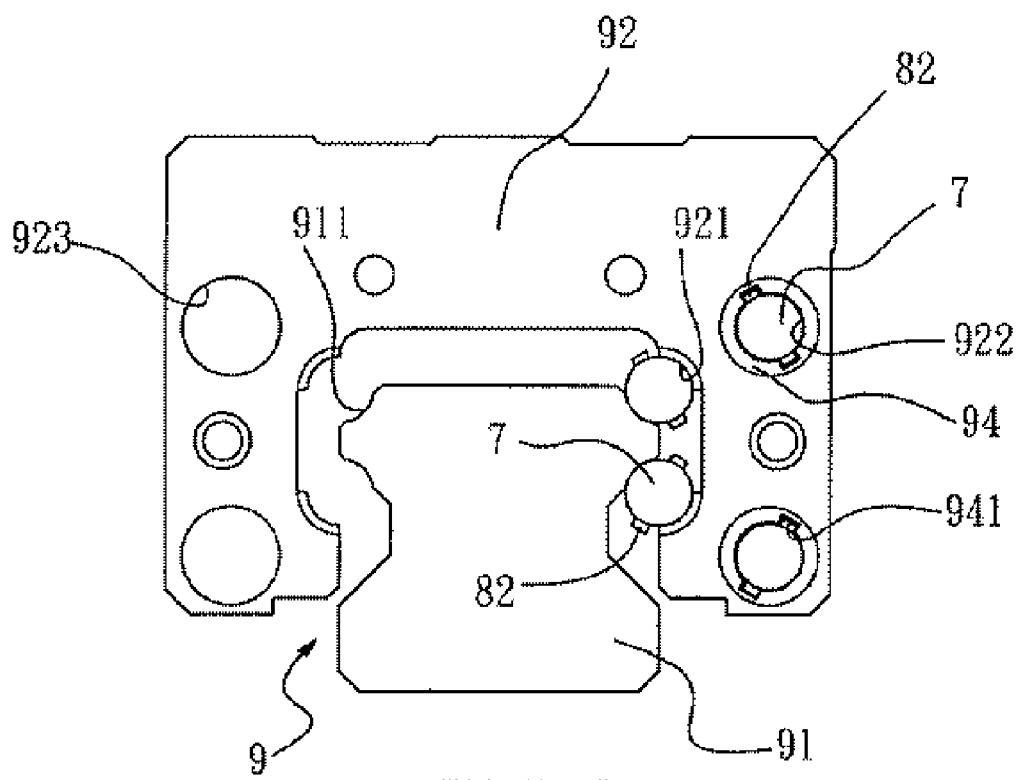
FIG. 2 is an illustrative assembly view of a conventional sliding block and a rail.
Figure 3:
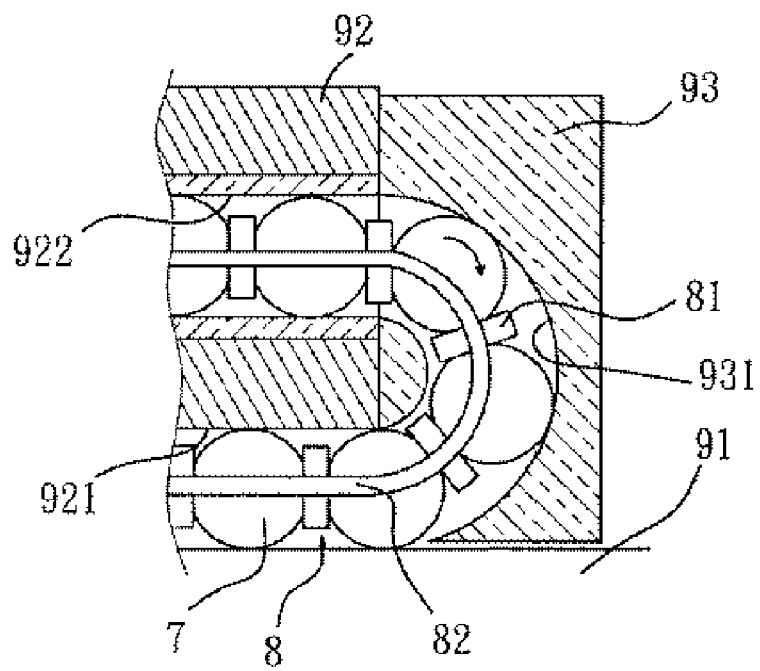
FIG. 3 is a cross sectional view of showing a part of a conventional linear guideway.
Figure 4:
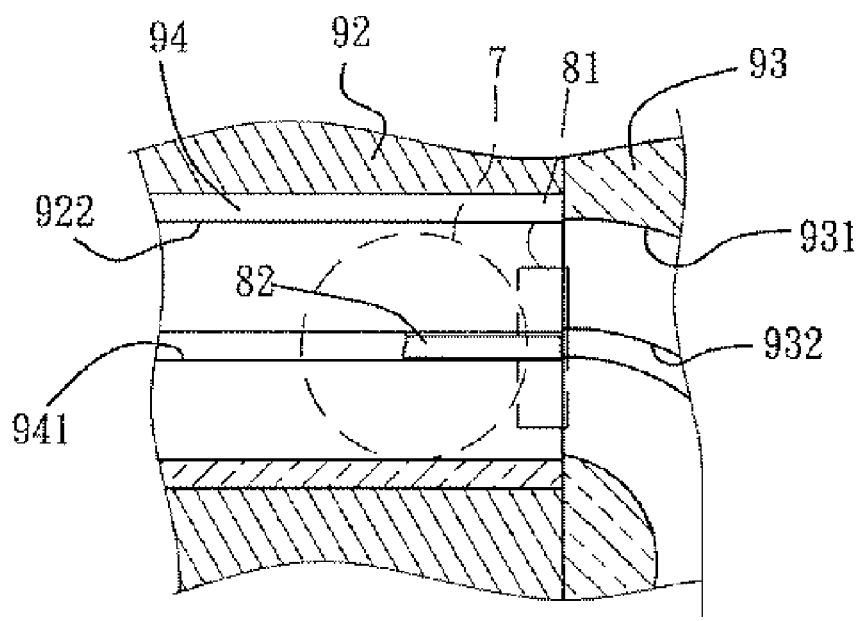
FIG. 4 is an illustrative view of showing that, the conventional ball chain is being interfered during operation.
Figure 5:
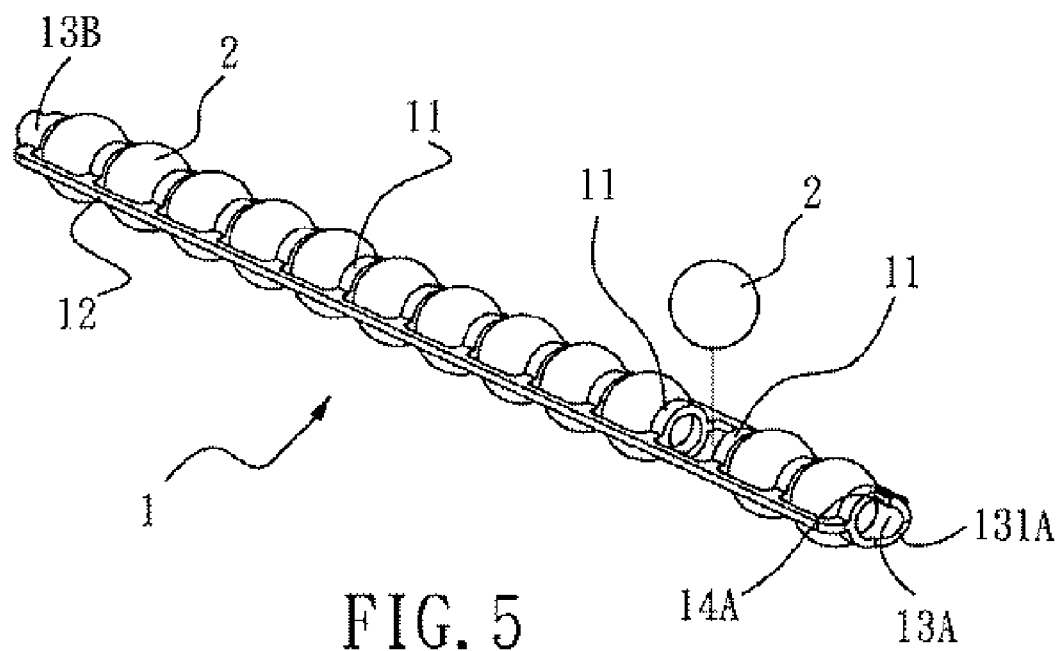
FIG. 5 is a perspective view of a ball chain in accordance with a first embodiment of the present invention.
Figure 6:
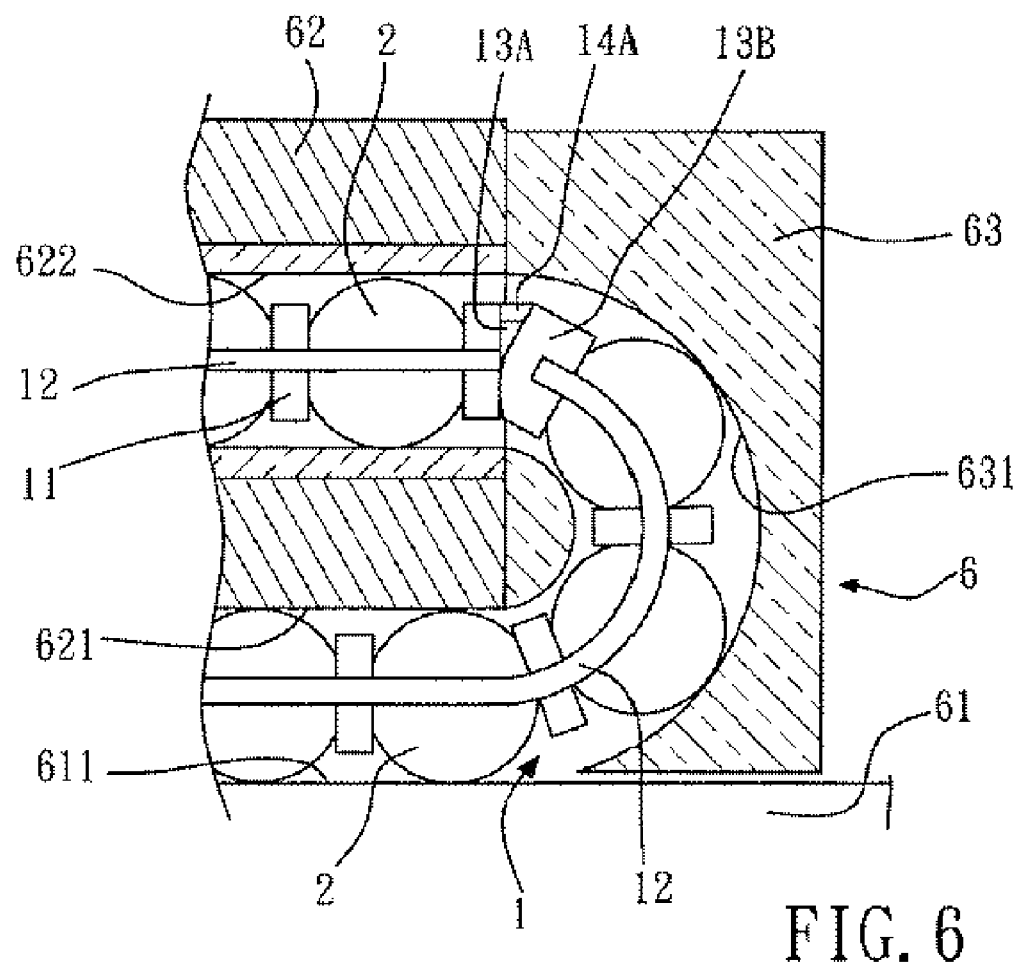
FIG. 6 is a cross sectional view of showing a part of a linear guideway in accordance with the first embodiment of the present invention.

Referring firstly to FIGS. 5 and 6, a ball chain 1 in accordance with the present invention is used in a linear guideway 6. The linear guideway 6 comprises a rail 61, a sliding block 62 and two caps 63 at both ends of the sliding block 62. In the rail 61 is formed a plurality of rolling tracks 611 for the balls 2. The sliding block 62 is formed with a plurality of ball grooves 621 for cooperating with the rolling tracks 611, and a plurality of circulation passages 622 for the balls 2. In each of he caps 63 is formed a return path 631 for jointing the circulation passages 622 to the ball grooves 621.

The ball chain in accordance with the present invention comprises a plurality of spacers 11 each of which is a hollow ring-shaped structure, the diameter of the respective spacers 111 is smaller than that of the balls 2, and a long narrow connecting member 12 is connected at either side of the respective balls 2 to form an elongated structure. The balls 2 are received between the spacers 11, and the spacers 11 at both ends of the chain 11 are formed with two protruded connecting blocks 13A and 13B. The connecting blocks 13A and 13B each has an abutting surface 14A and 14B, and the abutting surfaces 14A and 14B are designed to be parallel to the radial direction of the center (namely the center of the radius of curvature of the return path) of the radius of curvature of the chain.

Figure 7A:
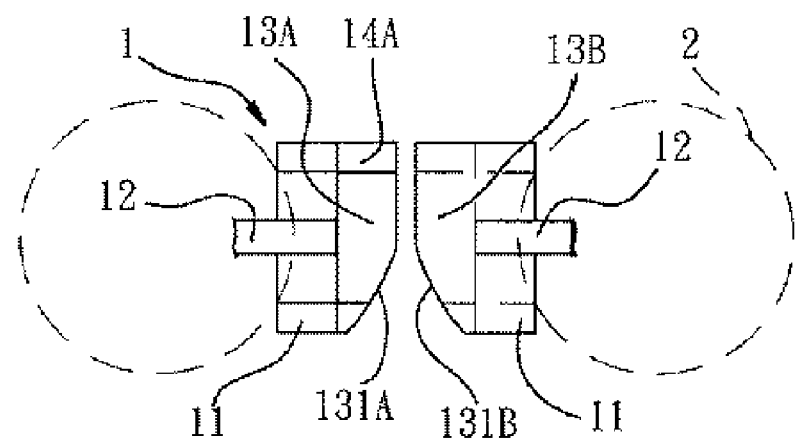
FIG. 7A is a side view of showing both ends of the ball chain in accordance with the first embodiment of the present invention.
Figure 7B:
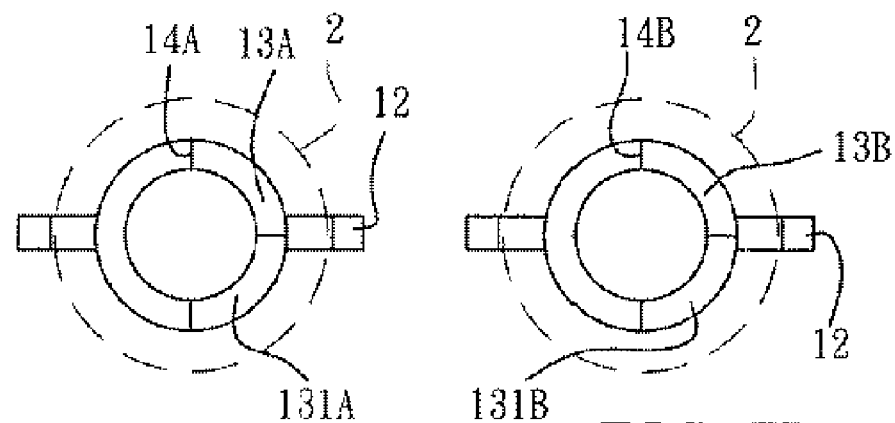
FIG. 7B is a front view of showing both ends of the ball chain in accordance with the first embodiment of the present invention.
Figure 7C:
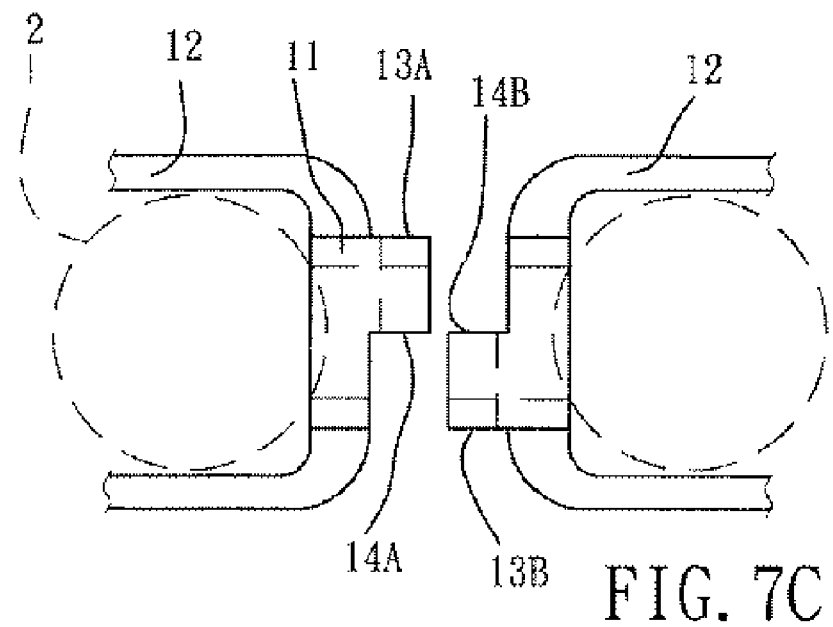
FIG. 7C is a top view of showing both ends of the ball chain in accordance with the first embodiment of the present invention.

Referring to FIGS. 7A-7C, in this embodiment, the connecting blocks 13A and 13B are designed to have a semi-circular cross section, the two connecting blocks 13A and 13B can be mated with each other to form a complete ring. In order to make the two connecting blocks 13A and 13B keep connecting to each other in the return path, a side of the connecting blocks 13A and 13B facing the center of the radius of curvature of the return path is designed to have a guiding angle 131A and 131B, so as to form a gap for allowing the two connecting blocks 13A and 13B to be staggered. By such arrangements, when the chain 1 moves in the return path 61, the two spacers 11 at both ends of the chain 1 can make the two abutting surfaces 14A and 14B keep contacting each other within a certain angle, as shown in FIG. 6.

Figure 8:
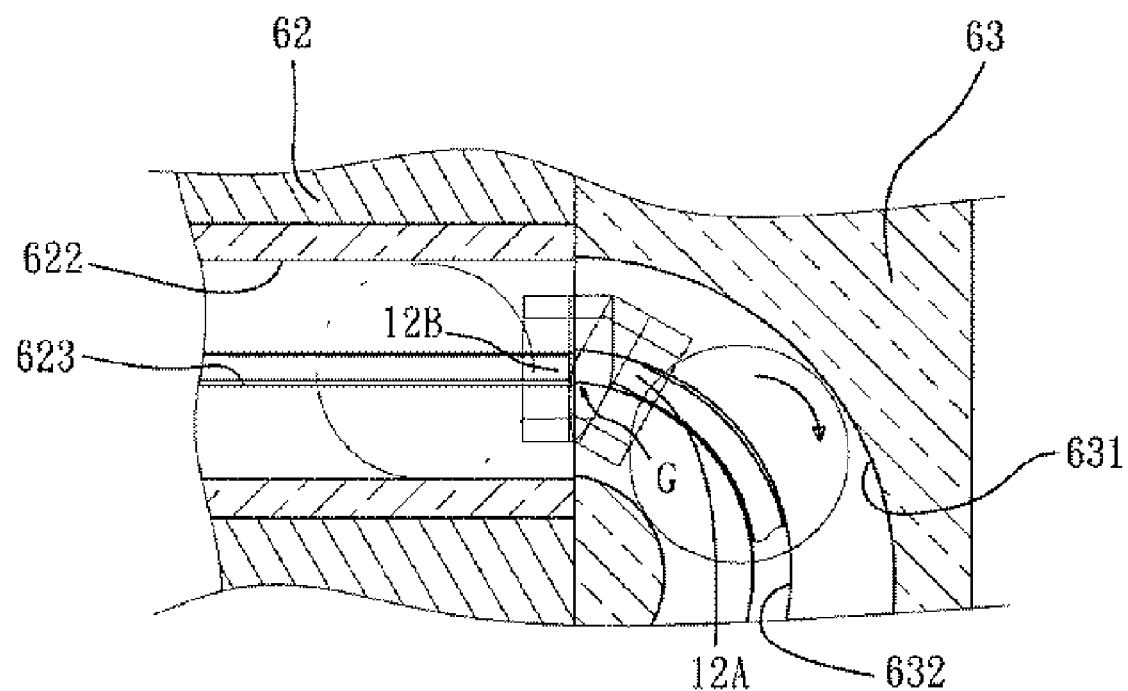
FIG. 8 is an illustrative view in accordance with the first embodiment of the present invention, of showing that the ball chain enters the return path smoothly.

Referring to FIG. 8, since the connecting members 12 protrude out of the balls 2, it is necessary to define a receiving groove 623 and an arc groove 632 in the sliding block 62 and the end caps 63, respectively. Such arrangement can enable the connecting members 12 to be received in the receiving groove 623 and the arc groove 632, during the movement of the chain 1 and the balls 2.

Referring then to FIGS. 6 and 8, since both ends of the chain 1 are jointed together through the engagement of the two connecting blocks 13A and 13B, plus the abutting surfaces 14A and 14B of the two connecting blocks 13A and 13B that are parallel to the center of the radius of curvature of the return path can abut against each other, after the end of connecting block 13B enters the return path 631, the two connecting members 12A at this end will be engaged in the two arc grooves 632. At this moment, the abutting surface 14B will serve as a limiting surface that can limit the radial distortion of the connecting block 13A, ensuring that the end of the chain where the connecting block 13A being located will not be distorted, as it occurs in the prior art, so that the connecting member 12B at the same end of the chain as the connecting block 13A can smoothly traverse the manufacturing-tolerance caused level different G between the sliding block 62 and the end caps 63. As a result, the problem of level difference interfering with the connecting member can be solved.

Figure 9:
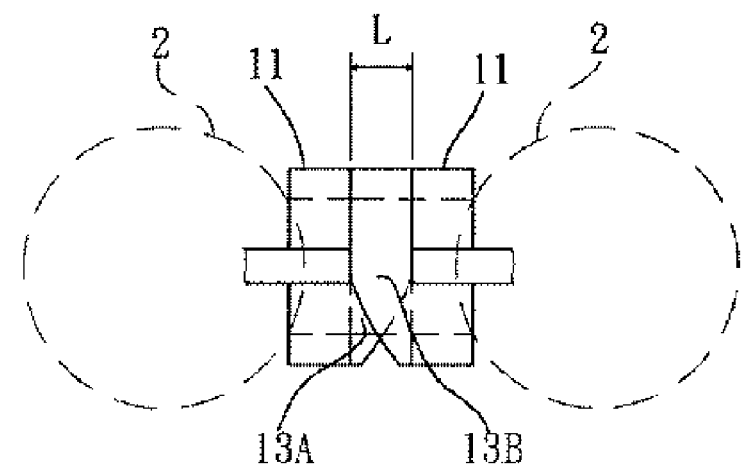
FIG. 9 is a side view in accordance with the first embodiment of the present invention, of showing that both ends of the ball chain mate with each other.

Besides, the two connecting blocks 13A and 13B at both ends of the chain 1 are jointed without being axially fixed, and the connecting blocks 13A and 13B have a certain length L, as shown in FIG. 9, therefore, the total length of the chain 1 has a certain room to change in response to the change of work surrounding (such as the temperature caused expansion and retraction) or the manufacturing error of the sliding block and the end caps, so that the connecting blocks at both ends of the chain can keep contacting.

Moreover, the spacers 11 of the present invention are flat structure, so that the balls 2 are in a line contact relation to the spacers 11, as shown in FIG. 9. As compared to the surface contact relation of the prior art, the aforesaid structure of the present invention can reduce the contacting surface between the balls 2 and the spacers 11 to the least, thus preventing an increase in the waste of momentum.

In general, due to the connecting blocks at both ends of the chain are designed to be jointed in a manner of being parallel to the center of the radius of curvature of return paths, it can suppress the radial distortion of the chain, thus obtaining an effect of improving the operating smoothness of the chain.

Figure 10A:
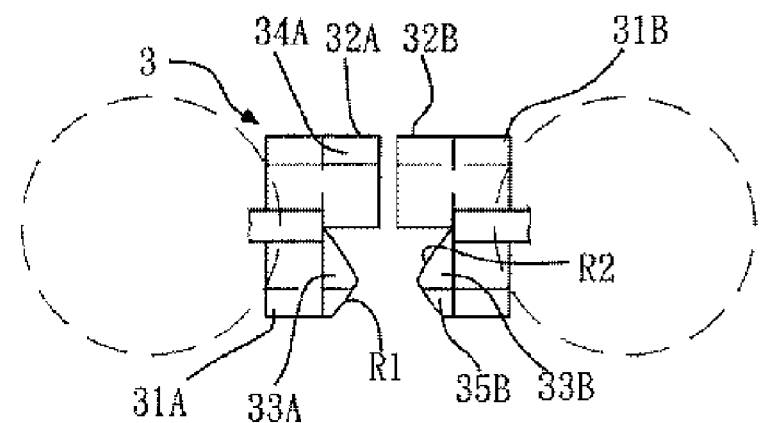
FIG. 10A is a side view of showing both ends of the ball chain in accordance with a second embodiment of the present invention.
Figure 10B:
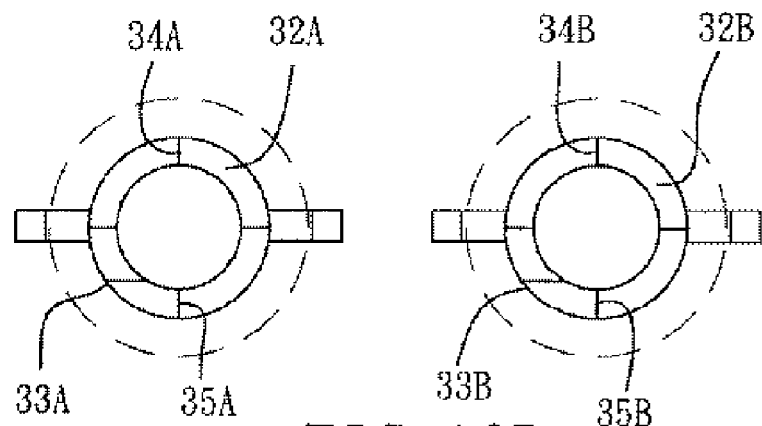
FIG. 10B is a front view of showing both ends of the ball chain in accordance with the second embodiment of the present invention.
Figure 10C:
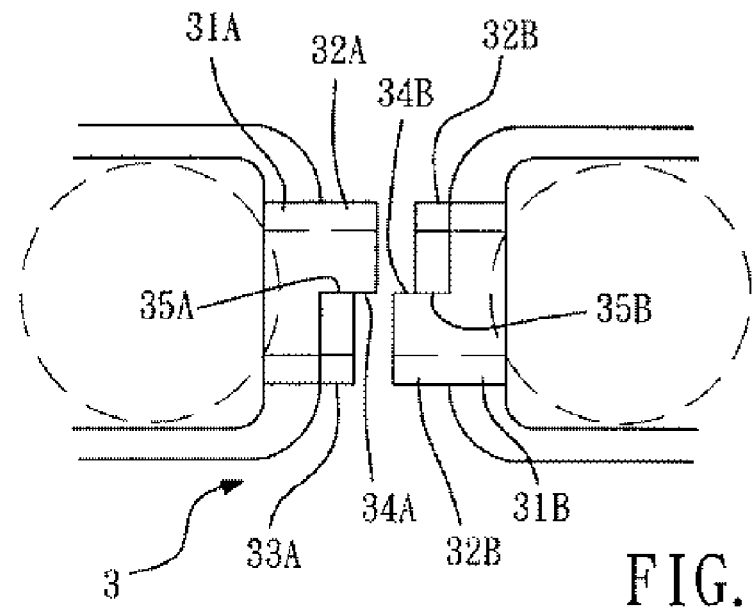
FIG. 10C is a top view of showing both ends of the ball chain in accordance with the second embodiment of the present invention.

Of course, the chain having both ends connected by the connecting blocks is limited by the structure disclosed in the first embodiment. With reference to FIGS. 10A-10C, which show a second embodiment of the present invention, wherein the spacers 31A and 31b at both ends of the chain 3 each has two radially opposite connecting blocks 32A, 33A, 32B, and 33B that are ¼ circle-shaped in cross section. Each of the connecting blocks 32A, 33A, 32B, and 33B has an abutting surface 34A, 34B, 35A and 35B that is parallel to the center of the radius of curvature of the return path, so that the connecting blocks 31A and 31B at both ends of the chain can be mated with each other. Furthermore, each of the connecting blocks 33A and 33B is formed at both sides thereof with a guiding angle R1 and R2 that are located facing the center of the radius of curvature of the return path, and facing the connecting blocks 32A and 32B, respectively. By such arrangements, when the chain moves in the return path, at least the two abutting surfaces 34A and 34B can keep contacting each other, therefore, it also can obtaining the same function as the first embodiment.

Figure 11A:
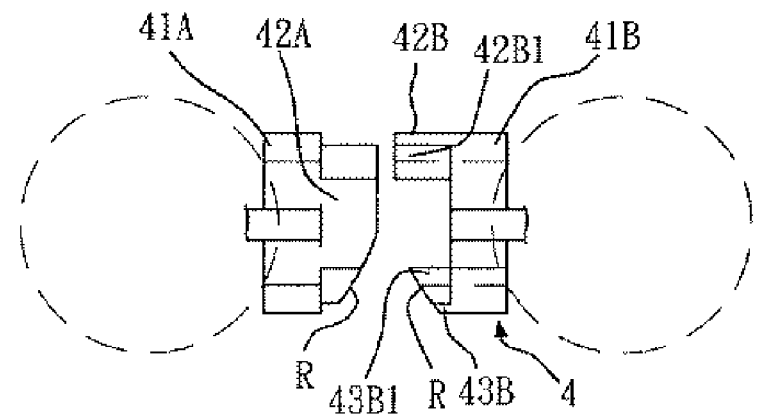
FIG. 11A is a side view of showing both ends of the ball chain in accordance with a third embodiment of the present invention.
Figure 11B:
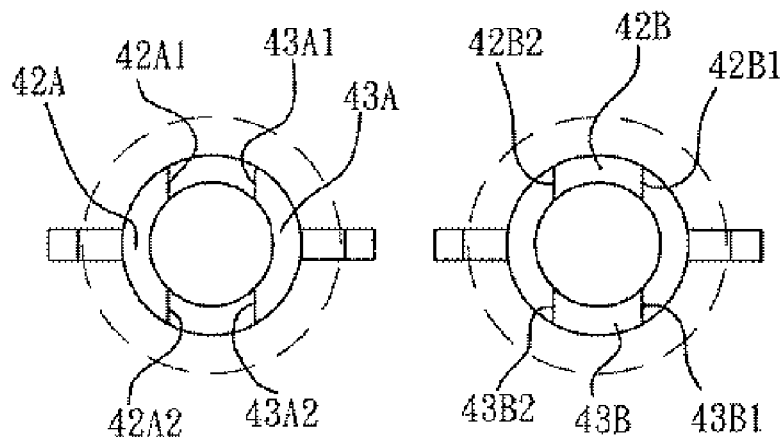
FIG. 11B is a front view of showing both ends of the ball chain in accordance with the third embodiment of the present invention.
Figure 11C:
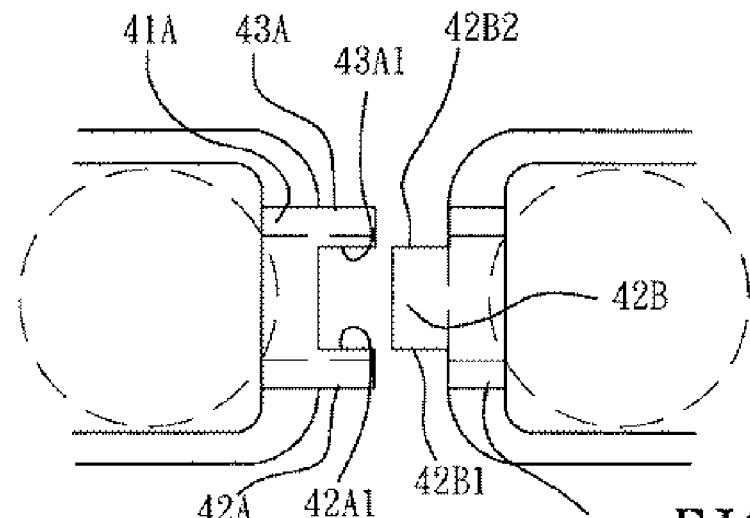
FIG. 11C is a top view of showing both ends of the ball chain in accordance with the third embodiment of the present invention.

Referring to FIGS. 11A-11C, which show a third embodiment of the present invention, wherein the spacers 41A and 41B at both ends of the chain 4 each has two radially opposite connecting blocks 42A, 43A, 42B, and 43B. Each of the connecting blocks 42A, 43A, 42B, and 43B has two abutting surface 42A1, 42A2, 43A1, 43A2, 42B1, 42B2, 43B1 and 43B2, that are parallel to the center of the radius of curvature of the return path. Furthermore, a side of each of the connecting blocks 42A, 43A and 43B, facing the center of the radius of curvature of the return path, is formed with a guiding angle R. By such arrangements, when the chain moves in the return path, at least the abutting surfaces 42A1, 42B1, 43A1, and 42B2 can keep contacting each other, therefore, it also can obtaining the same function as the first embodiment.

Figure 12A:
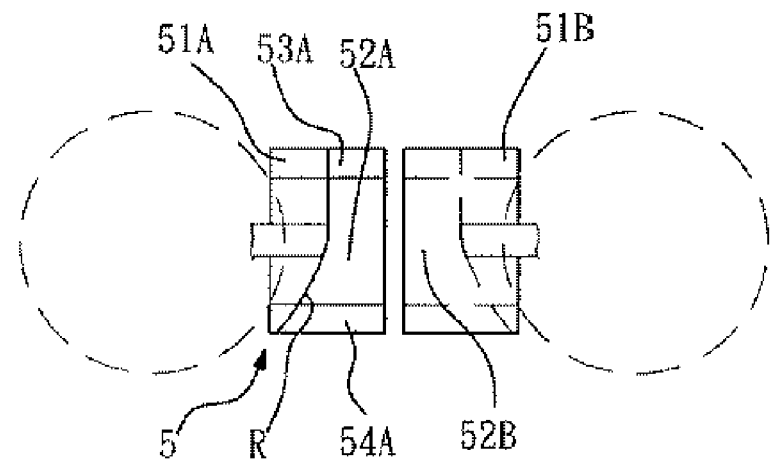
FIG. 12A is a side view of showing both ends of the ball chain in accordance with a fourth embodiment of the present invention.
Figure 12B:
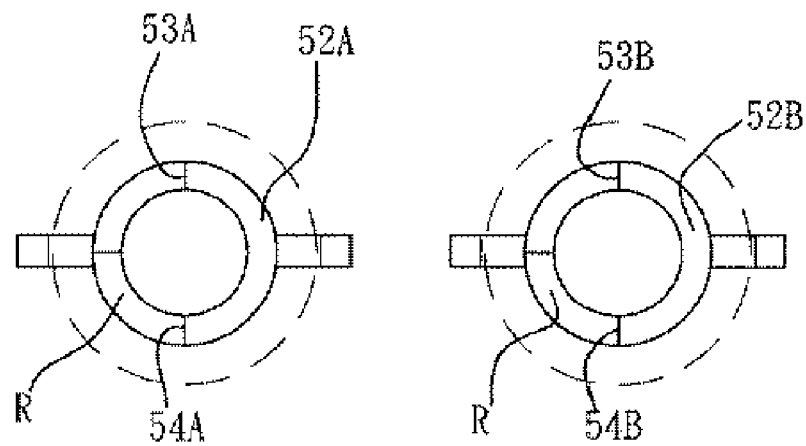
FIG. 12B is a front view of showing both ends of the ball chain in accordance with the fourth embodiment of the present invention.
Figure 12C:
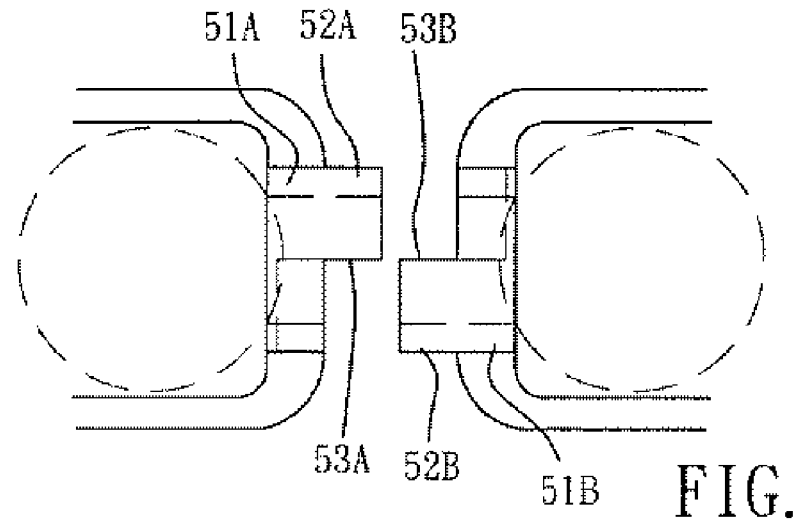
FIG. 12C is a top view of showing both ends of the ball chain in accordance with the fourth embodiment of the present invention.

Referring to FIGS. 12A-12C, which show a fourth embodiment of the present invention, wherein the spacers 51A and 51B at both ends of the chain 5 each has a connecting block 52A and 52B having a semicircular cross section, so that the connecting blocks 52A and 52B can be mated with each other to form a complete circle. Each of the connecting blocks 52B, and 52B has two abutting surface 52A, 53B, 54A and 54B, that are parallel to the center of the radius of curvature of the return path. Furthermore, a side of the respective connecting blocks 51A and 51B, facing the center of the radius of curvature of the return path, is formed with a guiding angle R, thus forming a gap for allowing the two connecting blocks to be staggered. By such arrangements, as the chain moves in the return path, the abutting surfaces 53A, 53B, 54A and 54B can keep contacting each other, therefore, it also can obtaining the same function as the first embodiment. Due to the guiding angle R of this embodiment is set on the spacers 51A and 51B, the connecting blocks 52A and 52B can maintain an intact semicircular shape, so that the total length of the chain has the largest room to change, having an optimum capability in response to the change of work surrounding.

To sum up the above, the present invention is mainly to change the connection form between the two ends of the chain, with the aid of the abutting surface arranged parallel to the center of the radius of curvature of return path, the abutting surfaces of the connecting blocks at both ends of the chain can keep contact each other, when the chain moves in the return path. Therefore, it can suppress the radial distortion of the chain and can guide the end of the chain, which hasnt entered the return path, into the return path smoothly, thus improving the operating smoothness of the chain.

While we have shown and described various embodiments in accordance with the present invention, it should be clear to those skilled in the art that further embodiments may be made without departing from the scope of the present invention.

What is claimed is:

1. A ball chain comprising a plurality of spacers, each of which is a hollow ring-shaped structure, a diameter of the respective spacers is smaller than that of balls, a long narrow connecting member is connected at either side of the balls to form an elongated chain structure, the balls are received between the spacers, and a spacer at either end of the chain is formed with a protruded connecting block, the connecting blocks each has an abutting surface, and the abutting surfaces are parallel to a radial direction of a center of the radius of curvature of the ball chain, the abutting surfaces of the connecting blocks of the spacers at both ends of the chain are mated with each other, and limit axial rotation of the spacers at both ends of the ball chain.

2. The ball chain as claimed in claim 1, wherein the respective connecting block is semicircular in cross section, so that two connecting blocks can mate with each other to form a complete circle.

3. The ball chain as claimed in claim 2, wherein a side of the respective connecting blocks, facing the center of the radius of curvature of the return path, is designed to have a guiding angle, so as to form a gap for allowing the two connecting blocks at both ends of the ball chain to be staggered, by such arrangement, the abutting surfaces can keep contacting each other when the ball chain is bent.

4. The ball chain as claimed in claim 1, wherein the spacers at both ends of the ball chain each has two radially opposite connecting blocks that are ¼ circle-shaped in cross section, and each of the connecting blocks has an abutting surface that is parallel to the center of the radius of curvature of the return path, so that the connecting blocks at both ends of the chain can mate and connect with each other.

5. The ball chain as claimed in claim 4, wherein a side of the respective connecting blocks, facing the center of the radius of curvature of the return path, is designed to have a guiding angle, so as to form a gap for allowing the two connecting blocks at both ends of the ball chain to be staggered, by such arrangement, the abutting surfaces can keep contacting each other when the ball chain is bent.

6. The ball chain as claimed in claim 1, wherein the spacers at both ends of the ball chain each has two radially opposite connecting blocks, and each of the connecting blocks has an abutting surface that is parallel to the center of the radius of curvature of the return path.

7. The ball chain as claimed in claim 6, wherein a side of the respective connecting blocks, facing the center of the radius of curvature of the return path, is designed to have a guiding angle, so as to form a gap for allowing the two connecting blocks at both ends of the ball chain to be staggered, by such arrangement, the abutting surfaces can keep contacting each other when the ball chain is bent.

8. The ball chain as claimed in claim 1, wherein the spacers at both ends of the chain each has a connecting block having a semicircular cross section, so that the connecting blocks can mate with each other to form a complete circle, each of the connecting blocks has two abutting surface that are parallel to the center of the radius of curvature of the return path, a side of the respective connecting blocks, facing the center of the radius of curvature of the return path, is formed with a guiding angle, thus forming a gap for allowing the two connecting blocks to be staggered, so that the respective abutting surfaces can keep contacting each other, when the ball chain is bent.

9. The ball chain as claimed in claim 1, wherein each of the spacers is a flat and circular structure, so that the balls are in a line contact relation to the spacers.

* * * * *